United States Patent
Yan et al.

(10) Patent No.: US 8,496,433 B2
(45) Date of Patent: Jul. 30, 2013

(54) WIND MILL STRUCTURE OF LIFT-TYPE VERTICAL AXIS WIND TURBINE

(75) Inventors: Qiang Yan, Shanghai (CN); Yihui Shen, Shanghai (CN); Dong Zhang, Shanghai (CN); Chaoqi Jiang, Shanghai (CN); Haifeng Niu, Shanghai (CN)

(73) Assignee: Qiang Yan, Shanghai (CN)

( * ) Notice: Subject to any disclaimer, the term of this patent is extended or adjusted under 35 U.S.C. 154(b) by 0 days.

(21) Appl. No.: 13/228,477

(22) Filed: Sep. 9, 2011

(65) Prior Publication Data

US 2012/0003092 A1     Jan. 5, 2012

Related U.S. Application Data

(63) Continuation of application No. PCT/CN2010/000299, filed on Mar. 12, 2010.

(30) Foreign Application Priority Data

Mar. 12, 2009    (CN) .......................... 2009 1 0128001

(51) Int. Cl.
*F03D 7/06*       (2006.01)

(52) U.S. Cl.
USPC ........... 416/107; 416/106; 416/118; 416/119; 416/140

(58) Field of Classification Search
USPC ................. 416/103–107, 118, 119, 138, 140, 416/141, 136, 44, 48
See application file for complete search history.

(56) References Cited

U.S. PATENT DOCUMENTS

| | | | | | |
|---|---|---|---|---|---|
| 1,859,584 | A | * | 5/1932 | De La Cierva | 416/107 |
| 1,974,074 | A | * | 9/1934 | Larsen | 416/103 |
| 4,299,537 | A | | 11/1981 | Evans | |
| 4,452,568 | A | * | 6/1984 | Andersson | 416/119 |
| 4,718,821 | A | * | 1/1988 | Clancy | 416/119 |
| 5,518,367 | A | * | 5/1996 | Verastegui | 416/119 |
| 2009/0016892 | A1 | | 1/2009 | Yan | |
| 2009/0196753 | A1 | | 8/2009 | Yan | |

FOREIGN PATENT DOCUMENTS

| | | |
|---|---|---|
| CN | 1831330 A | 9/2006 |
| DE | 19544400 A1 | 6/1997 |
| EP | 0021790 A1 | 1/1981 |
| JP | 2008-75487 A | 4/2008 |
| WO | WO 2008/046283 A1 | 4/2008 |

OTHER PUBLICATIONS

International Search Report for PCT/CN2010/000299, dated Jun. 3, 2010.*

(Continued)

*Primary Examiner* — Christopher Verdier
(74) *Attorney, Agent, or Firm* — Manni Li; Mei & Mark LLP

(57) ABSTRACT

A wind mill structure of a lift-type vertical axis wind turbine. The lift-type vertical axis wind turbine includes a vertical shaft and the wind mill includes a plurality of blades and supporting arms. The supporting arms hold the blades, and the blades are connected to the vertical shaft via the supporting arms. A setting angle, formed by a chord of the blades and a tangent line that goes through the center of the blades, ranges from −12° to 12°. An angle, formed by the chord of the blade and the rotatable supporting arm, ranges from 7° to 100°. The wind mill can maintain relatively stable rotation speeds under wind speeds exceeding the rated wind speed by adjusting the angle of the supporting arms, thereby ensuring stable output from the vertical axis wind turbine.

12 Claims, 16 Drawing Sheets

OTHER PUBLICATIONS

International Preliminary Examination Report for PCT/CN2010/000299, dated May 30, 2011.*
Written Opinion for PCT/CN2010/000299, dated May 28, 2010.*
U.S. Appl. No. 12/342,067, filed Dec. 22, 2008.*
U.S. Appl. No. 12/422,963, filed Apr. 13, 2009.*
U.S. Appl. No. 12/960,529, filed Dec. 5, 2010.*
U.S. Appl. No. 13/163,777, filed Jun. 20, 2011.*
U.S. Appl. No. 13/187,558, filed Jul. 21, 2011.*
U.S. Appl. No. 13/164,750, filed Jun. 20, 2011.*

* cited by examiner

FIG. 3 -- Prior Art --

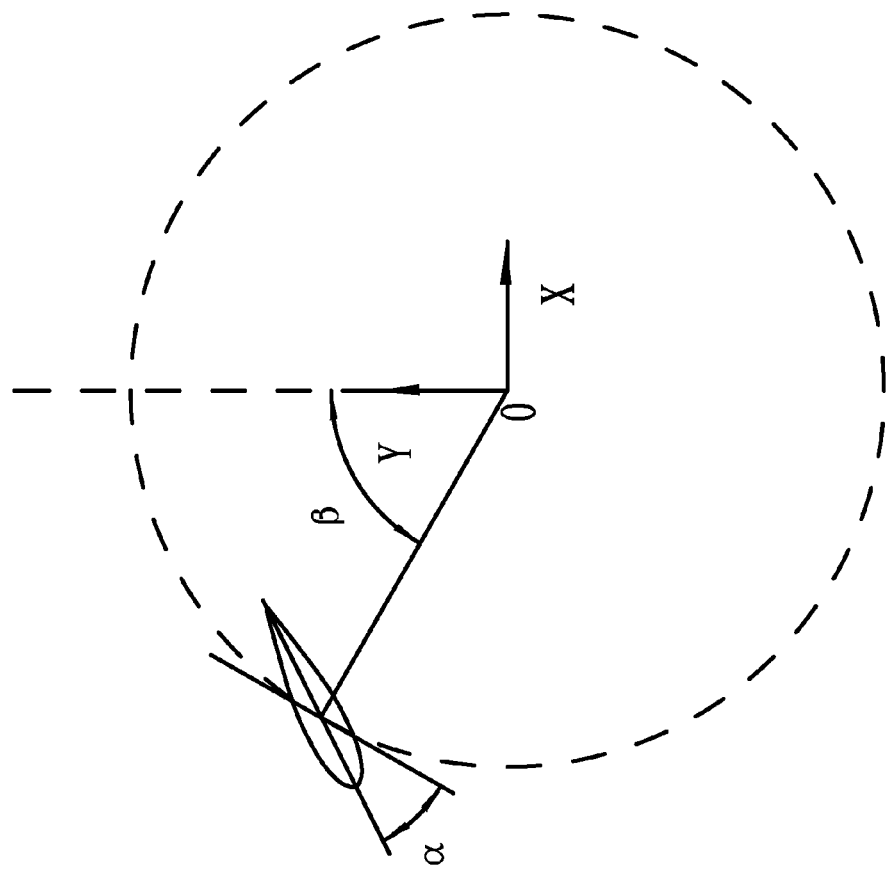
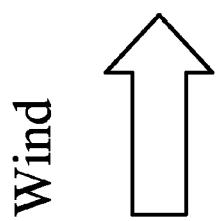
FIG. 5

WIND MILL STRUCTURE OF LIFT-TYPE VERTICAL AXIS WIND TURBINE

CROSS-REFERENCE TO RELATED APPLICATIONS

This application is a continuation of International Patent Application No. PCT/CN2010/000299 with an international filing date of Mar. 12, 2010, designating the United States, now pending, and further claims priority benefits to Chinese Patent Application No. 200910128001.3 filed Mar. 12, 2009. The contents of all of the aforementioned applications, including any intervening amendments thereto, are incorporated herein by reference.

BACKGROUND OF THE INVENTION

1. Field of the Invention

The invention relates to a lift-type vertical axis wind turbine, and more particularly to a structure capable of enabling the wind mill to maintain relatively stable rotation speeds under wind speeds exceeding the rated wind speed by adjusting the angle of the supporting arms which hold the blades, thereby ensuring stable output from the vertical axis wind turbine.

2. Description of the Related Art

The followings are some terminologies concerning wind turbine technologies:

Wind speed: a mean value of wind speeds at a certain height in a 10 minutes period, and usually the mean value of wind speeds at 10 meters above grassland in a 10-minute-period for reference.

Effective wind speed: since the wind speed varies all the time, not all wind speed is able to make the wind mill to rotate or to rotate safely. Effective wind speed refers to the wind speed which can make the wind mill rotate safely.

Effective wind speed range: the wind speed that can make the wind mill rotate safely and the generator output normally. Upon designing wind turbines, the range between the cut-in wind speed and the cut-out wind speed is called effective wind speed range, e.g., between 6 and 20 m/s.

Cut-in wind speed: the minimum wind speed at which the wind mill starts to rotate and power is generated.

Rated wind speed: the wind speed at which the rated output (nameplate capacity) is reached.

Cut-out wind speed: the wind speed above which the wind mill is shut down to avoid damage.

Speed governor: the rotation speed of wind mills varies with the wind speed, and a device that makes the wind mills rotate around the rated rotation speed is called a speed governor, which works only when the wind speed exceeds the rated wind speed.

Vertical axis wind turbine: wind turbines can rotate around either a horizontal or a vertical axis, therefore wind turbines can be divided into horizontal axis wind turbines and vertical axis wind turbines, and wind turbines that rotate around a vertical axis are called vertical axis wind turbines.

Wind mill: the wind mill of the vertical axis wind turbine includes a plurality of supporting arms and blades, the blades are connected to the vertical shaft via the supporting arms.

Vertical axis wind turbines can be divided into drag-type and lift-type, which are different in working principles and configurations. The blades of the drag-type wind turbine may be of a cup, a semi-sphere, a half bucket, or even simply a flat board. FIG. 1 shows a drag-type vertical axis wind turbine. The blade is of a half bucket, and when the wind blows the wind mill, the pressure exerting on the blade at the D1 point is two times that exerting on the blade at the D2 point. Since the pressures at D1 and D2 are different, the wind drives the wind blades to rotate around the hub clockwise. Therefore, the most distinct feature of the drag-type wind turbine is that the wind drives the blades to move from high pressure point to low pressure point, and thus the wind mill rotates from high pressure point to low pressure point.

To improve the efficiency of the drag-type wind turbine, i.e., to increase the pressure difference between the D1 and D2 point of the blades, various measures have been tried, e.g. using more blades, adjusting the shape of the blades, and so on. The most widely-used method is to adjust the angle of the blades when the blades rotate in the lower section of the wind mill. As shown in FIG. 2, assume the angle is 0° at the D1 point, when rotating to the D2 point, the blade is modified to have an angle of 90°. There are many measures to adjust the angles of the blades, but no matter what measures are employed, the wind energy utilization efficiency of the drag-type wind turbine can never exceed 2/27. The following, ignoring the resistance caused by the drag-type wind turbine blades in the lower section, shows how the conclusion is reached.

Assuming the length of each blade is H, and the width thereof is R, the angular velocity of the wind mill rotation is ω, the radius of the wind mill equals the blade width R, the wind speed is V, and the density is ρ; suppose the wind-to-blade pressure have the maximum value, and regardless of the blade resistance in case the projected area is in the minimum, the blade with the biggest projected area equals to a board with a width of R and length of H.

Total wind energy on the projected area of wind mill is:

$$E = \frac{1}{2}\rho V^3 S = \frac{1}{2}\rho V^3 2RH = \rho V^3 RH.$$

The airflow-to-blade speed is: v=V=ωR.

The airflow-to-blade pressure is:

$$p = \frac{1}{2}\rho(V - \omega R)^2 RH.$$

The output is:

$$P(\omega) = T\omega \leq pR\omega = \frac{1}{2}\rho(V - \omega R)^2 RHR\omega = \frac{1}{2}\rho(V - \omega R)^2 R^2 H\omega.$$

Finding the extreme values and we get: when ωR=0=V, P gets the minimum value, and when ωR=⅓V, P gets the maximum value, i.e. the biggest output of the drag-type wind turbine is achieved when the linear speed of the rotation of the wind mill is ⅓ the wind speed. Substituting ωR=⅓V, we get the maxima of output is $$\frac{2}{27}\rho V^3 RH,$$

ignoring the resistance in the other section, and in accordance with the definition of wind energy utilization efficiency, we get:

$$\eta = \frac{\text{Output of wind mill}}{\text{total wind energy on projected area of wind will}}$$

$$= \frac{P}{E} = \frac{\frac{2}{27}\rho V^3 RH}{\rho V^3 RH} = \frac{2}{27} \leq 8\%.$$

To address the low efficiency of the drag-type vertical axis wind turbine, the lift-type vertical axis wind turbine has been created. FIG. 3 shows a lift-type vertical axis wind turbine, whose surfaces are of different curves. When the wind blows on the blades, the wind speeds at the inner surface and the outer surface of the blades are different because of the different shapes of blade surfaces and the setting angle of the blades. Therefore, wind speed difference exists between the inner surface and the outer surface. Fluid mechanics tells us that when the flow speeds at the inner and outer surfaces are different, pressure difference, i.e., lift, is formed. When certain setting angles of the blades are used, the component force of the lift created by the pressure difference will create a torque surrounding the wind turbine hub, thereby making the wind turbine rotate.

FIG. 4 is a schematic drawing of the force analysis of a lift-type vertical axis wind turbine. Since the actual speed and direction of the airflow-to-blades is V2 (In FIG. 4, V0 represents the wind speed, and V1 represents the speed of wind-to-blades-rotation-direction), under such wind speed and direction, a resistance D parallel to the airflow and a lift L perpendicular to the airflow are formed in the blades. When the wind speed exceeds a certain value, the lift in the airfoil is far greater than the resistance D; therefore the blades are mainly driven by the torque produced by the tangential direction component L1 of the lift L. Therefore, the most distinctive feature of a lift-type wind turbine is that its blade section must be in the shape of curves (airfoil profile) and the setting angle is small. The airfoil usually is one of those in the prior art, or a new airfoil formed using different curves of conventional airfoils, or a new airfoil formed by a plurality of curves at least meeting second order derivable function, or a new airfoil formed by splines.

The scale of aerodynamic resistance formed during the blade rotation is related to the setting angle of blades. The bigger the setting angle, the bigger the resistance. Therefore, to achieve a better efficiency, the setting angle of lift-type wind turbine blades is usually small. To illustrate the importance of the setting angle of the blades to the efficiency of the wind mill, definitions regarding blade specifications are given below (see FIG. 5):

Leading edge (of the blade): the round end.
Trailing edge (of the blade): the sharp tail.
Chord: the line between the leading edge and the trailing edge.
Setting angle α: the angle between the chord and the tangent line that goes through the center of the blade, and α is a positive value clockwise, and a negative value counterclockwise.
Azimuth: the angle between the blade-center to axis-of-rotation line and the positive y axis line.

The scale and direction of the torque generated on the blades varies with different blade azimuths, and at certain azimuths, the direction of the torque even reverses. To increase the efficiency of the lift-type vertical axis wind turbine, many measures are put forward, for example, choosing the right airfoil, setting angles, chord length, and blade number. A more effective way is to alter the setting angle α while the blades are in different azimuths, so that the blades can obtain the biggest lift at any azimuth. The measures focus on altering the setting angle of the blades when the blades are in different azimuths during one revolution, making the blades obtain the best setting angles α. The blades, in one revolution, obtain numerous comparatively small setting angles α. The setting angle changes when the wind mill rotates, which makes the lift-type vertical axis wind turbine obtain enough torque in low wind speed and resultant slow speed of rotation. The purposes are to improve the self-starting ability and the efficiency of the lift-type wind turbine in comparatively high wind speeds.

It can be concluded that the drag-type vertical axis wind turbines are totally different from the lift-type vertical axis wind turbines, so are the measures to improve their efficiency.

For vertical axis wind turbines with a fixed blade setting angle, within certain wind speed ranges, the rotation speed of the wind mill is proportional to the wind speed. The higher the wind speed, the higher the rotation speed. The wind energy is proportional to the cube of the wind speed. When the wind speed increases form 10 m/s to 25 m/s, the wind energy increases by nearly 16 times. While the wind speed may change dramatically, each wind turbine has its rated wind speed, at which the wind turbine works best. When the wind speed exceeds the rated wind speed, the output of the wind turbine is desirable to maintain around the rated output to protect the generator and system from damage. This problem is solved by yawing (reducing the projected area of the wind turbine) in horizontal axis wind turbines.

Because the blade setting angle of the drag-type vertical axis wind turbine can be changed in a wide angle range unrestrained, the drag-type vertical axis wind turbine reduces the projected area of the wind turbine to achieve the same object. Measures reducing the projected area of the wind turbine to lower the output will not change the efficiency of the wind turbine. For example, the diameter of the wind turbine in high rotation speed is contracted to stabilize the output. In the extreme case, the wind turbine is contracted to a bucket shape.

The lift-type vertical axis wind turbine may reduce the projected area of the wind turbine to lower its output by hydraulic units and electronic control technology, but the configuration is complicated and costly, which makes it difficult to be widely used in small and medium wind turbines, and it will not be elaborated here. We can see from the equation for the wind turbine output $$P = \frac{1}{2}\rho V^3 SCp,$$

to lower the output of the wind turbine, besides cutting the projected area S of the wind turbine, a preferred method to stabilize the output is by lowering the efficiency Cp of the wind turbine, thus protecting the turbine system from damage caused by strong winds at a lower cost.

In the prior art, to achieve a higher efficiency of wind turbines, the preferred blade setting angle is from 2° to 8°, and within such range, the efficiency changes only slightly, while out of the range, the efficiency of the wind turbine decreases rapidly. A restriction slot is used to restrain the changes of the blade setting angle within a narrow range. Furthermore, changing the blade setting angle can lower the efficiency of the lift-type turbine when the wind speed exceeds the rated speed to stabilize the output under high winds conditions, in which the blade setting angle changes within a narrow range through a flexible component. However, in the prior art, the changing range of the blade setting angle has not been disclosed, and the flexible component needs further improvement.

SUMMARY OF THE INVENTION

In view of the above-described problems, it is one objective of the invention to provide a wind mill structure of a lift-type vertical axis wind turbine that can achieve stable output. The wind mill functions as a speed governor of the vertical axis wind turbine and is especially suitable for small and medium vertical axis wind turbines.

To achieve the above objectives, in accordance with one embodiment of the invention, there is provided a wind mill structure of a lift-type vertical axis wind turbine, the lift-type vertical axis wind turbine comprising a vertical shaft, the wind mill comprising a plurality of blades and supporting arms, the supporting arms holding the blades, and the blades connected to the vertical shaft via the supporting arms; wherein an airfoil profile of the blades is chosen from those in the art, or a new airfoil formed using different curves of conventional airfoils, or a new airfoil formed by a plurality of curves at least meeting second order derivable function, or a new airfoil formed by splines;

the supporting arms comprise fixed supporting arms connected with the vertical shaft and rotatable supporting arms which hold the blades; one end of the rotatable supporting arms connects with and can rotate around one end of the fixed supporting arms; a pivot is provided in a connecting part of the end of the fixed supporting arms and the end of the rotatable supporting arms;

the other end of the rotatable supporting arms connects with a controlling device, the controlling device controlling the angle of the rotatable supporting arms rotating around the pivot; the controlling device connects with one end of a neighboring fixed supporting arm, and a plurality of the controlling devices is disposed in this way;

the controlling device is a flexible component, a hydraulic unit, an electronic component, or a mixture thereof;

a setting angle $\alpha$, formed by a chord of the blade and a tangent line that goes through the center of the blade, ranges from $-12°$ to $12°$; and an angle G, formed by the chord of the blade and the rotatable supporting arm, ranges from $7°$ to $100°$.

In a class of this embodiment, an angle A, formed by the rotatable supporting arm and an extension line of the fixed supporting arm, ranges from $0°$ to $90°$.

In a class of this embodiment, the angle A, formed by the rotatable supporting arm and the extension line of the fixed supporting arm, ranges preferably from $20°$ to $90°$.

In a class of this embodiment, a length ratio of the fixed supporting arm to the rotatable supporting arm is between 10:1 and 1:1.

As in FIG. 5, while the blade setting angle $\alpha$ decreases and becomes a negative value, the efficiency of the wind mill drops rapidly. When $\alpha$ is smaller than $-6°$, the efficiency of the wind mill drops by nearly 10 times, with the projected area unchanged. When a becomes further smaller (e.g., $-4°$ changed to $-8°$), the tangent direction component L1 of the lift changes in both scale and direction, resulting in the change of the rotation direction of the wind mill. The angle $\theta$ denotes the Azimuth in FIG. 5.

Based on the above description, a preloaded force is exerted on the blade setting angle using the flexible component, making the blade setting angle changes between $8°$ and $-8°$. The preloaded force exactly equals to the component of the centrifugal force produced when the blades rotate around the rotating center (the vertical shaft) and the wind mill rotates at the rated speed. The blade setting angle will remain unchanged within the rated wind speed. When the wind speed exceeds the rated wind speed, the rise of the rotation speed of the wind mill makes the component of the centrifugal force exceed the preloaded force deployed by the flexible component. As a result, the blade setting angle will decrease from $8°$ gradually, but the output of the wind mill will not increase substantially. With the continuous increase of the wind speed, the rotation speed and component of the centrifugal force increase, and the blade setting angle will decrease to below $2°$ and become a negative value. With further increase of the wind speed, the blade setting angle becomes negative, resulting in the rapid decrease of torque on blades and the output of the wind mill. By doing so, the wind mill is able to obtain stable output with rapid increase in wind speed, and the speed regulating issue for lift-type wind turbines under strong wind conditions is solved, thereby facilitating the wide use of the lift-type vertical axis wind turbines.

In a class of this embodiment, the flexible component is an extension spring.

In a class of this embodiment, one end of the extension spring is connected with a length-adjustable tension device; the tension device is adjusted to preload an initial force to preset rated wind speed.

In a class of this embodiment, the tension device is a length-adjustable turnbuckle with an adjusting range between 1 cm and 50 cm.

In a class of this embodiment, the flexible component is a compression spring or hydraulic unit.

In a class of this embodiment, the pivot is of a slot structure, and one end of the fixed supporting arms is connected with one end of the rotatable supporting arms using a bolt, thereby constituting the pivot; a slot is provided at one end of the fixed supporting arms, and a tongue is provided at one end of the corresponding rotatable supporting arms, and when the rotatable supporting arms rotate around the pivot, the interfaces between the slot and the tongue work to restrict the rotatable supporting arm to rotate within a preset range.

Advantages of the invention are summarized below. This invention, by improving the structure of the supporting arms, stabilizes the rotation speed of the wind mill under wind speeds that exceed the rated wind speed, thereby ensuring the stable output of vertical axis wind turbines.

This invention will be described in details with the illustration of the drawings and examples.

BRIEF DESCRIPTION OF THE DRAWINGS

FIG. 5 is a schematic diagram of angles of a wind mill of a lift-type vertical axis wind turbine structure according to one embodiment of the invention;

DETAILED DESCRIPTION OF THE EMBODIMENTS

The following implementation examples give a further detailed description of this invention, but are not a limitation to this invention.

Example 1

Figure 1:
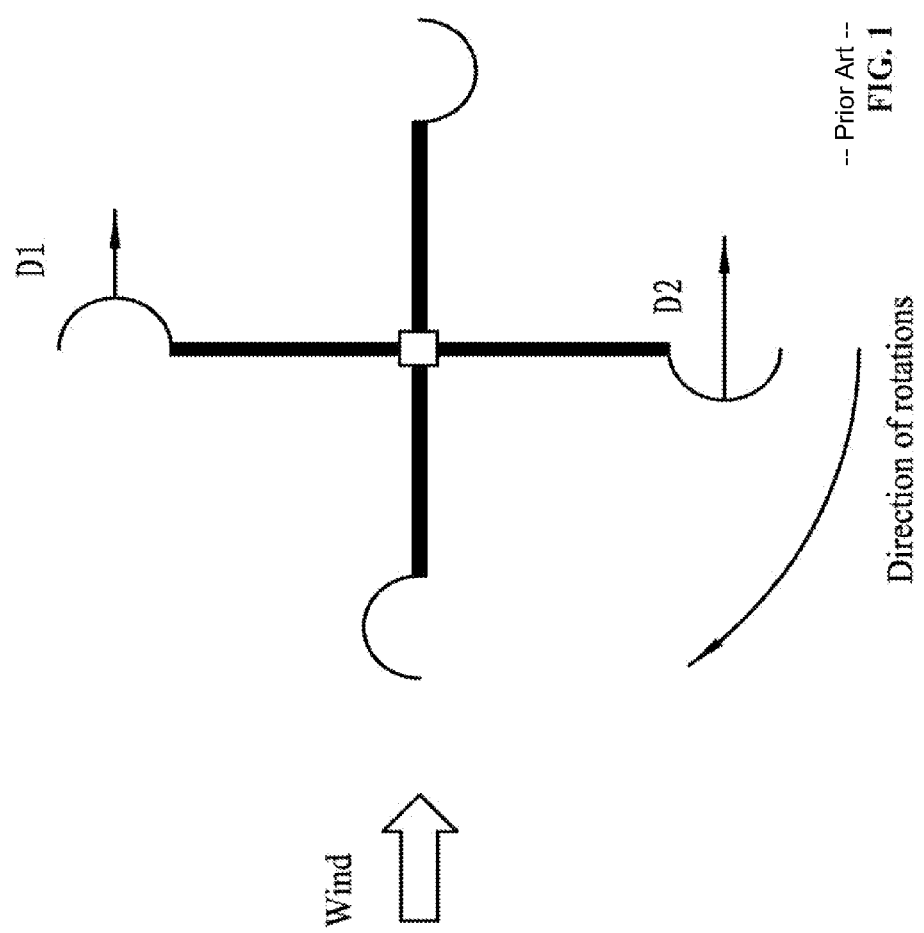
FIG. 1 is a schematic diagram of a wind mill of a drag-type vertical axis wind turbine structure.
Figure 2:
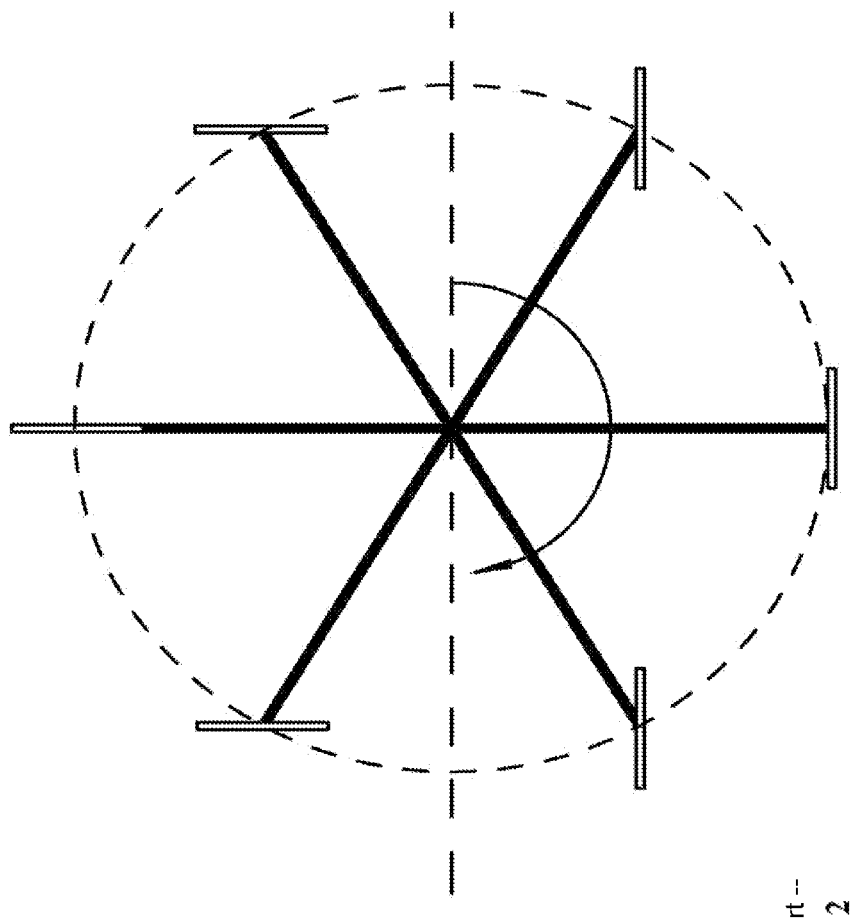
FIG. 2 is a schematic diagram of a wind mill of another drag-type vertical axis wind turbine structure.
Figure 3:
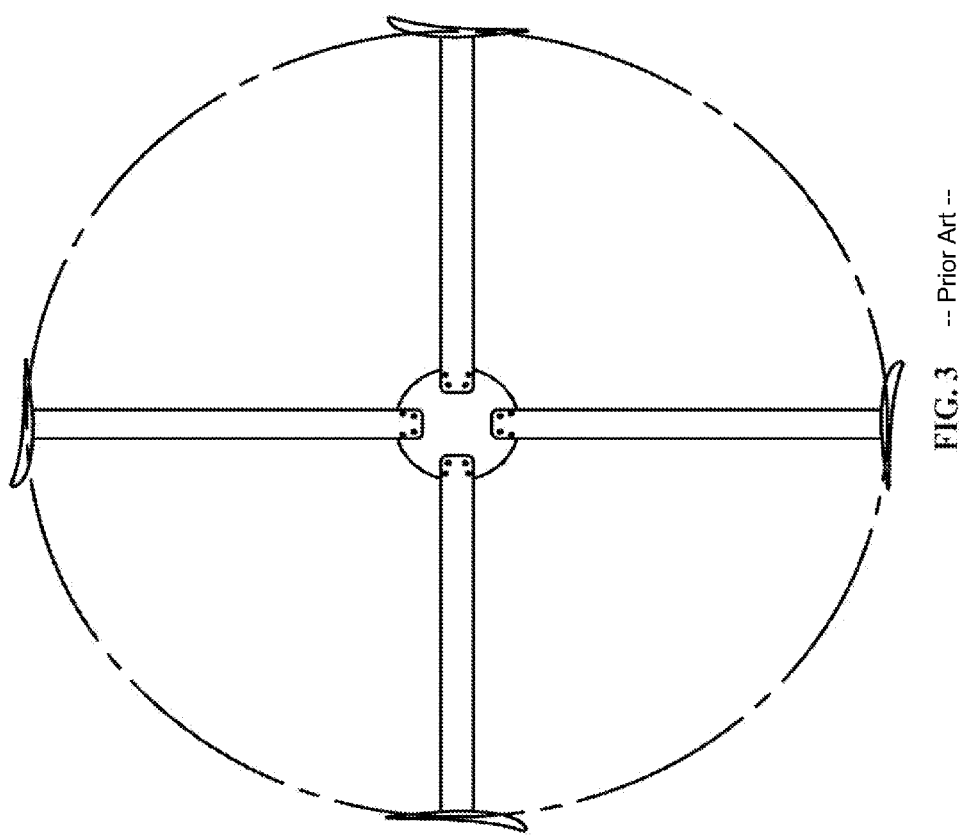
FIG. 3 is a schematic diagram of a wind mill of a lift-type vertical axis wind turbine structure.
Figure 4:
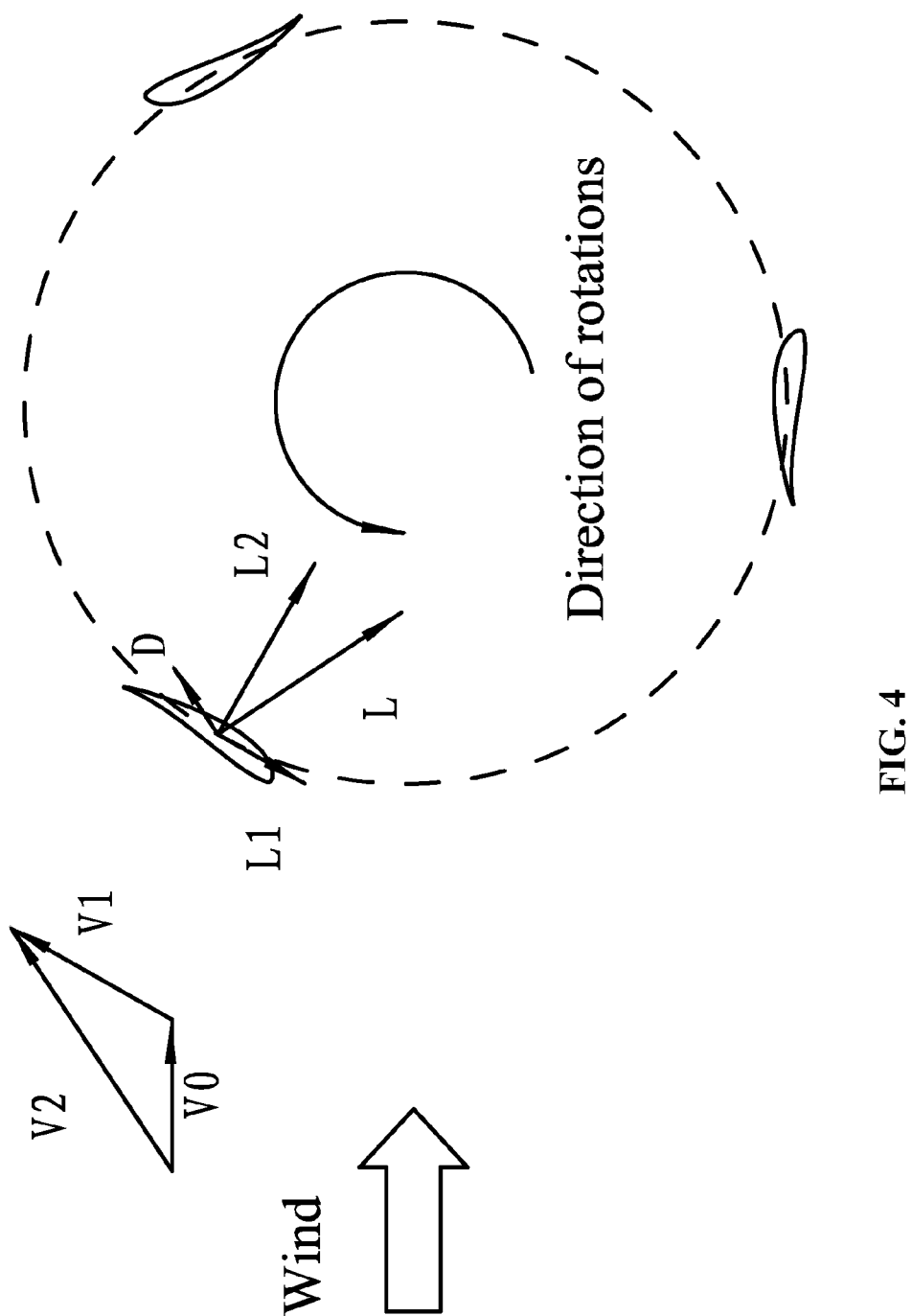
FIG. 4 is a schematic diagram of force analysis for a wind mill of a lift-type vertical axis wind turbine.
Figure 6:
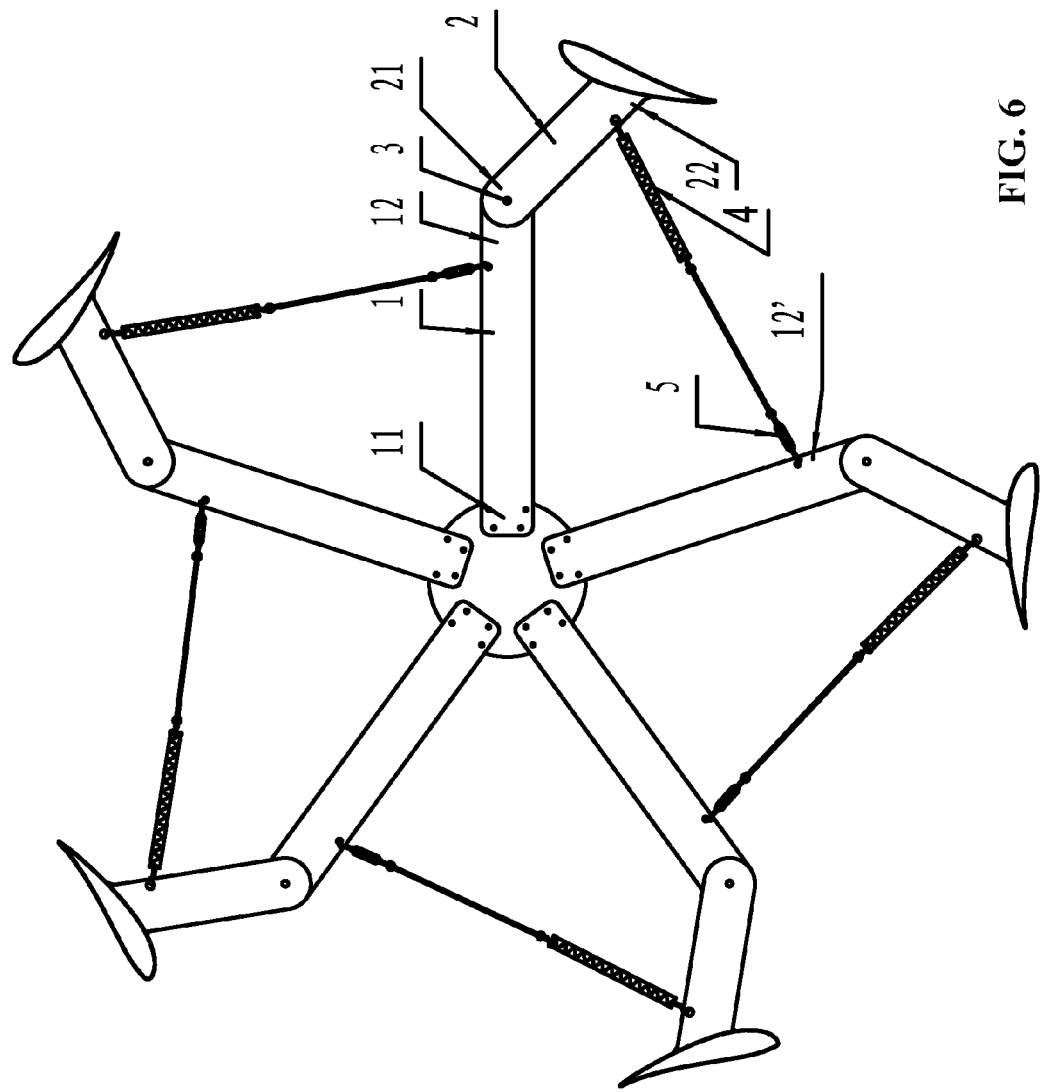
FIG. 6 is a schematic diagram of a wind mill of a lift-type vertical axis wind turbine according to one embodiment of the invention.

A wind mill structure of a lift-type vertical axis wind turbine, as shown in FIG. 6, comprises a plurality of supporting arms and blades. The wind turbine comprises a vertical shaft. The supporting arms hold the blades. The blades are connected to the vertical shaft via the supporting arms. The airfoil profile of the blades are chosen from those in the art, or a new airfoil formed using different curves of conventional airfoils, or a new airfoil formed by a plurality of curves at least meeting second order derivable function, or a new airfoil formed by splines. The supporting arms comprise fixed supporting arms 1 connected with the vertical shaft at one end 11, and at the other end 12, with the rotatable supporting arms 2 which hold the blades. One end 21 of the rotatable supporting arms 2 connects with, and can rotate around the end 12 of the fixed supporting arms 1. A pivot 3 is provided in the connecting part of the end 12 of the fixed supporting arms 1 and the end 21 of the rotatable supporting arms 2. The other end 22 of the rotatable supporting arms 2 connects with a controlling device 4, which controls the angle of which the rotatable supporting arms 2 rotates around the pivot 3. The controlling device 4 connects with one end 12' of a neighboring fixed supporting arm, and a plurality of controlling devices 4 are disposed in this way.

Figure 10:
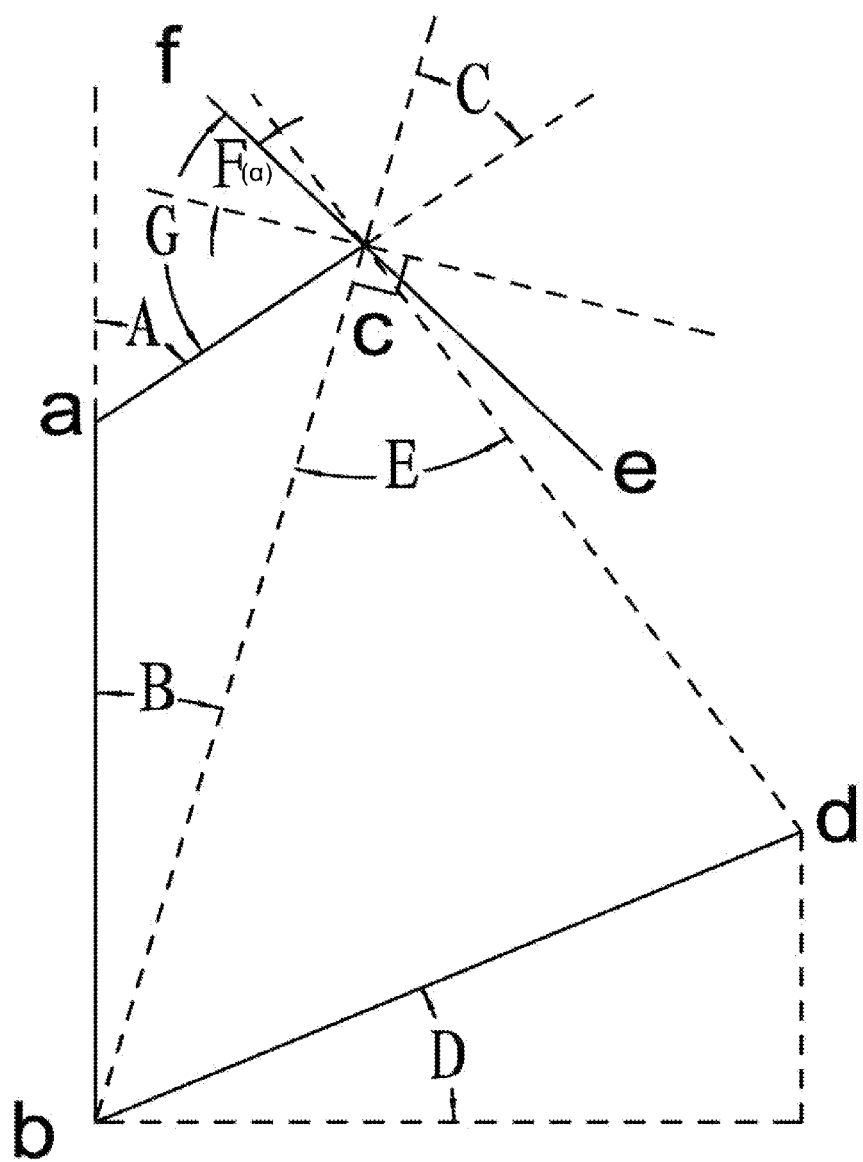
FIG. 10 is a schematic diagram of force analysis for supporting arms according to one embodiment of the invention.

FIG. 10 is a schematic diagram of force analysis for the supporting arms, in which ab represents the fixed supporting arm; ac represents the rotatable supporting arm; point a represents the position of the pivot 3; point b represents the hub of the wind mill; fe represents the chord of the blade, and point f represents the leading edge of the blade; point e represents the trailing edge of the blade; point c represents the center of the blade chord; and point d represents the connecting point at the end 12' of the neighboring fixed supporting arm. In FIG. 10, various angles are defined as follows: A represents the angle between the rotatable arm ac and the extension line of the fixed supporting arm ab; B represents the angle between the fixed supporting arm ab and the line bc connecting the far end b of the fixed supporting arm and the center of the blade chord point c; C represents the angle between the extension line of the rotatable support arm ac and the bc connecting the far end b of the fixed supporting arm and the center of the blade point c; D represents the complementary angle to the angle between the neighboring fixed supporting arms ab and db; E represents the angle between the line bc connecting the far end b of the fixed supporting arm and the center of the blade chord point c and line cd which is the connecting line between the center of the blade c and the connecting point d at the neighboring fixed support arm; F represents the angle between the chord fe of the blade and the tangent line at the center of the blade chord point c, which is also known as the blade setting angle α; G represents the angle between the rotatable supporting arm ac and the blade chord fe.

The setting angle α, formed by the blade chord and the tangent line that goes through the center of the blade, ranges from −12° to 12°. The angle G, formed by blade chord and the rotatable supporting arms 2, ranges from 7° to 100°.

Table 1 shows the ranges of Angle G corresponding to certain setting angles α:

TABLE 1

| Setting angle α | Angle G |
| --- | --- |
| −12°-12° | 7°-100° |
| −11°-12° | 7°-100° |
| −10°-12° | 7°-100° |
| −9°-12° | 7°-100° |
| −8°-12° | 7°-100° |
| −12°-11° | 7°-99° |
| −11°-11° | 7°-99° |
| −10°-11° | 7°-99° |
| −9°-11° | 7°-99° |
| −8°-11° | 7°-99° |
| −12°-10° | 7°-98° |
| −11°-10° | 7°-98° |
| −10°-10° | 7°-98° |
| −9°-10° | 7°-98° |
| −8°-10° | 7°-98° |
| −12°-9° | 7°-97° |
| −11°-9° | 7°-97° |
| −10°-9° | 7°-97° |
| −9°-9° | 7°-97° |
| −8°-9° | 7°-97° |
| −12°-8° | 7°-96° |
| −11°-8° | 7°-96° |
| −10°-8° | 7°-96° |
| −9°-8° | 7°-96° |
| −8°-8° | 7°-96° |

Angle A, formed by the rotatable supporting arms and the extension line of the fixed supporting arms, ranges from 0° to 90°, and preferably, ranges from 20° to 90°.

Table 2 shows the ranges of Angle G when the setting angle α is 12°, 9°, 6°, 3°, 0°, −3°, −6°, −9°, and −12°, respectively:

TABLE 2

| Setting angle α | Angle G |
| --- | --- |
| 12° | 22°-100° |
| 9° | 19°-97° |
| 6° | 16°-94° |
| 3° | 13°-91° |
| 0° | 10°-88° |
| −3° | 7°-85° |
| −6° | 7°-85° |
| −9° | 7°-85° |
| −12° | 7°-85° |

Table 3 shows the ranges of Angle G and Angle A when the setting angle α is 12°, 9°, 6°, 3°, 0°, −3°, −6°, −9°, and −12°, respectively:

TABLE 3

| Setting angle α | Angle G | Angle A |
|---|---|---|
| 12° | 22°-100° | 90°-20° |
| 9° | 19°-97° | 90°-20° |
| 6° | 16°-94° | 90°-20° |
| 3° | 13°-91° | 90°-20° |
| 0° | 10°-88° | 90°-20° |
| -3° | 7°-85° | 90°-20° |
| -6° | 7°-85° | 90°-20° |
| -9° | 7°-85° | 90°-20° |
| -12° | 7°-85° | 90°-20° |

In this example, the following conditions have been satisfied: wind mill having blades of Goe63 airfoil; diameter of wind mill: 1.36 meter; setting angle being −12°–12°, −9°–9°, and −8°–8°, respectively; length ratio of the fixed supporting arms to the rotatable supporting arms being 1:1; rated wind speed being 10 m/s, i.e. the speed governing function of the supporting arm structure provided hereof works when the wind speed exceeds 10 m/s. According to Table 4, "Computational fluid Dynamics (CFD) calculation table",

TABLE 4

CFD calculation table

| | Wind speed | | | |
|---|---|---|---|---|
| | 10 m/s | 15 m/s | 20 m/s | 25 m/s |
| Output (w) of wind turbines without the supporting arm structure provided hereof | 170 | 350 | 1360 | 2660 |
| Output (w) of wind turbines using the supporting arm structure provided hereof Setting angle α = −12°-12° | 158 | 208 | 223 | 225 |
| Output (w) of wind turbines using the supporting arm structure provided hereof Setting angle α = −9°-9° | 170 | 210 | 225 | 230 |
| Output (w) of wind turbines using the supporting arm structure provided hereof Setting angle α = −8°-8° | 172 | 211 | 228 | 235 |
| Output (w) of wind turbines using the supporting arm structure provided hereof Setting angle α = −10°-16° | 102 | 198 | 220 | 230 | when the wind speed increases from 10 m/s to 15 m/s, 20 m/s, and 25 m/s respectively, the output from the generator remain relatively stable. In contrast, for wind turbines without the supporting arm structure of the invention, the output increases from 170 w to around 2660 w.

To lower the cut-in wind speed while maintain stable output under high wind conditions, the setting angle α may be initially set bigger than 12°, e.g. 18°. Thus, the output is comparatively low under low wind speed condition, but achieves the goal of substantially stable output. As shown in Table 4, when the setting angle α ranges from −10° to 16°, the cut-in wind speed is lowered, and the output is 102 w when the wind speed is 10 m/s.

Wind tunnel experiments have shown that the supporting arm structure provided in this example is able to solve the problem of stable output.

Example 2

Figure 7:
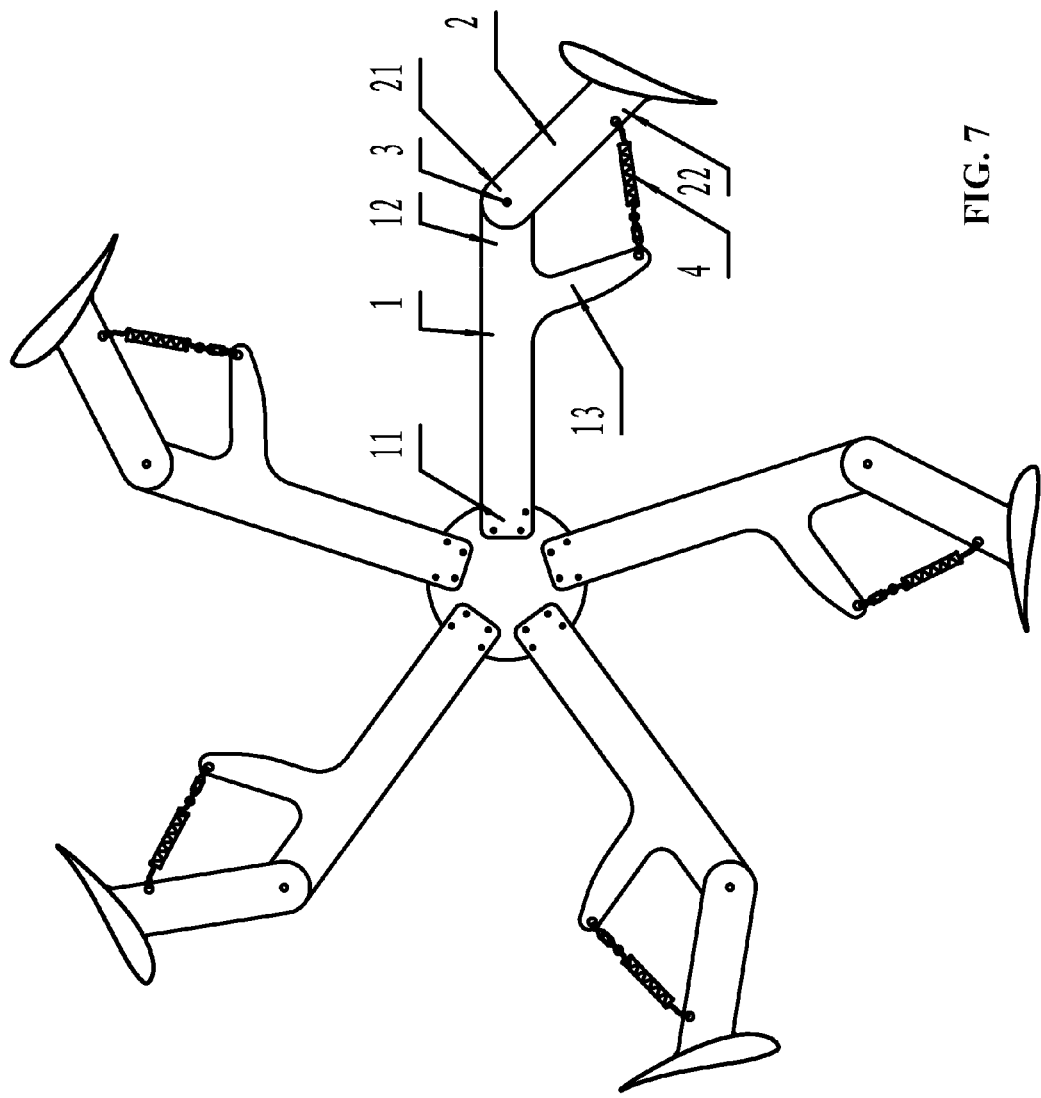
FIG. 7 is a schematic diagram of a wind mill of a lift-type vertical axis wind turbine according to one embodiment of the invention.

As shown in FIG. 7, the structure is basically the same as that provided in Example 1, except that the controlling device 4 is connected to a branch 13 of the fixed supporting arms, not the end 12' of the neighboring fixed supporting arms, and such a structure is able to achieve stable output as well.

Example 3

Figure 8:
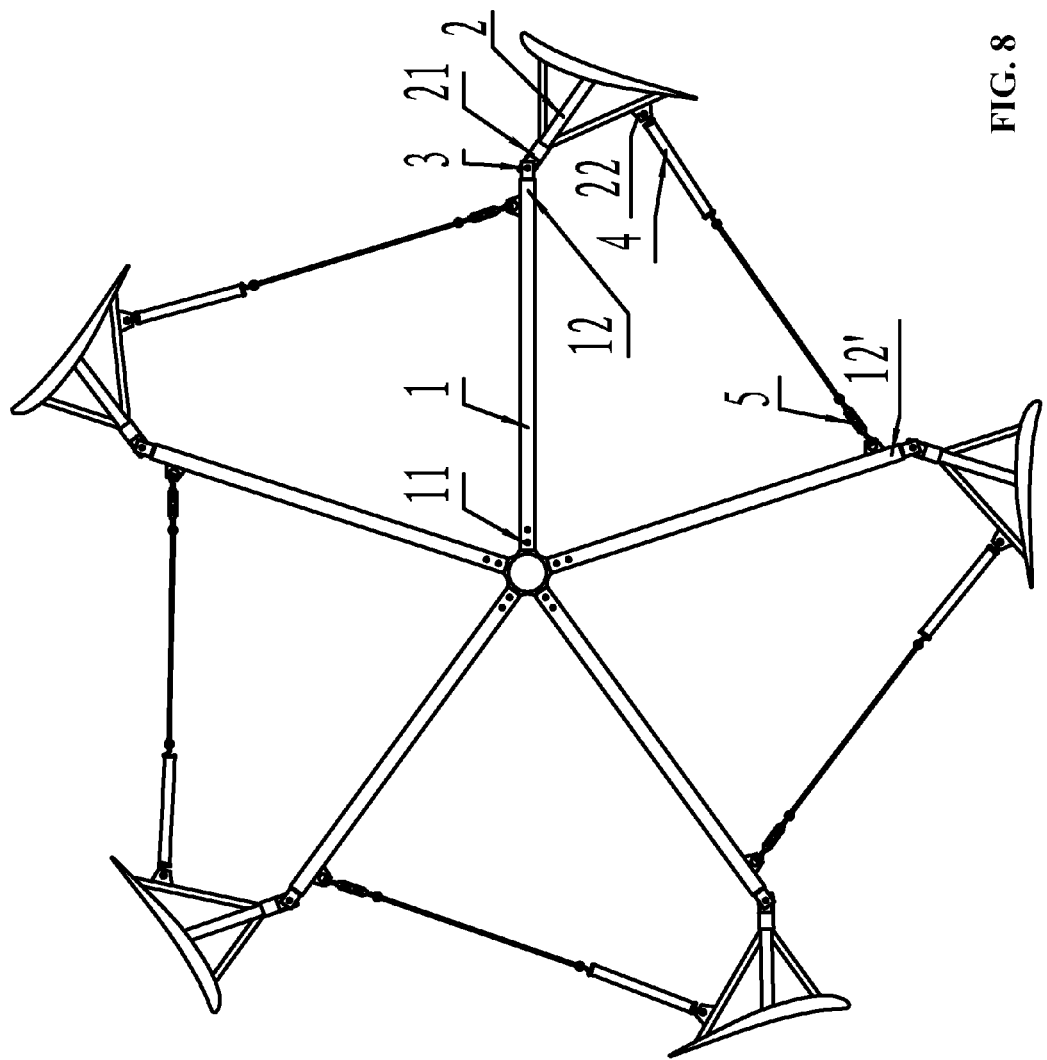
FIG. 8 is a schematic diagram of a wind mill of a lift-type vertical axis wind turbine according to one embodiment of the invention.
Figure 9:
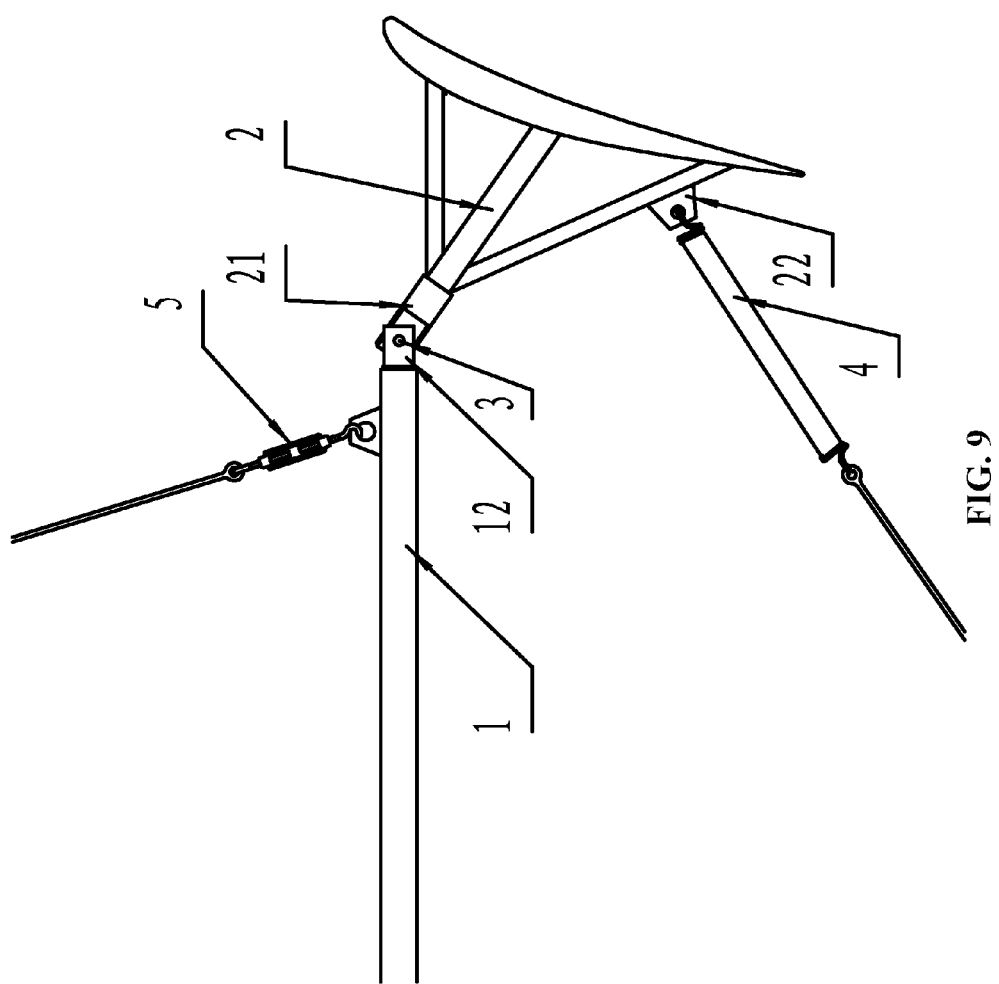
FIG. 9 is a partial enlarged view of FIG. 8.

As shown in FIG. 8 and FIG. 9, and based on the structure as provided in Example 1, the flexible component is an extension spring, one end of which is connected with the end 22 of the rotatable supporting arm, and the other end of which, via a length-adjusting tension device 5, is connected with the end 12' of the adjacent fixed supporting arm. Through the length-adjusting tension device 5, different preload may be set to adjust the rated wind speed. Preload is set using the length-adjusting tension device 5 which may be simply a length-adjustable bolt or other length-adjustable device, for example, a turnbuckle. The preload depends on an array of factors. Based on experiments, it is found that, different blade weights, wind mill diameters, and rated wind speeds influence the preload greatly. Different preload can be obtained by adjusting the length-adjusting tension device 5 provided the specifications of the extension spring 4 are given. Based on experiments, the preloaded length is preferably set at 1 cm to 50 cm. As shown Table 5, when the rated power of wind turbines is set at 1 KW, 3 KW, 5 KW, 10 KW, 50 KW, 100 KW, 200 KW, and 300 KW, respectively, the preload length of the extension spring are:

TABLE 5

| Rated power of wind turbine | Preload length of the extension spring |
|---|---|
| 1 kw | 1–10 cm |
| 3 kw | 3–12 cm |
| 5 kw | 3–15 cm |
| 10 kw | 3–15 cm |
| 50 kw | 10–40 cm |
| 100 kw | 15–50 cm |
| 200 kw | 15–50 cm |
| 300 kw | 15–50 cm |

However, in consideration of various blade weight, wind mill diameter, and rated wind speed, the preload length is not limited to the range of 1-50 cm, e.g., 0.5 cm may be chosen as well.

Example 4

Figure 14:
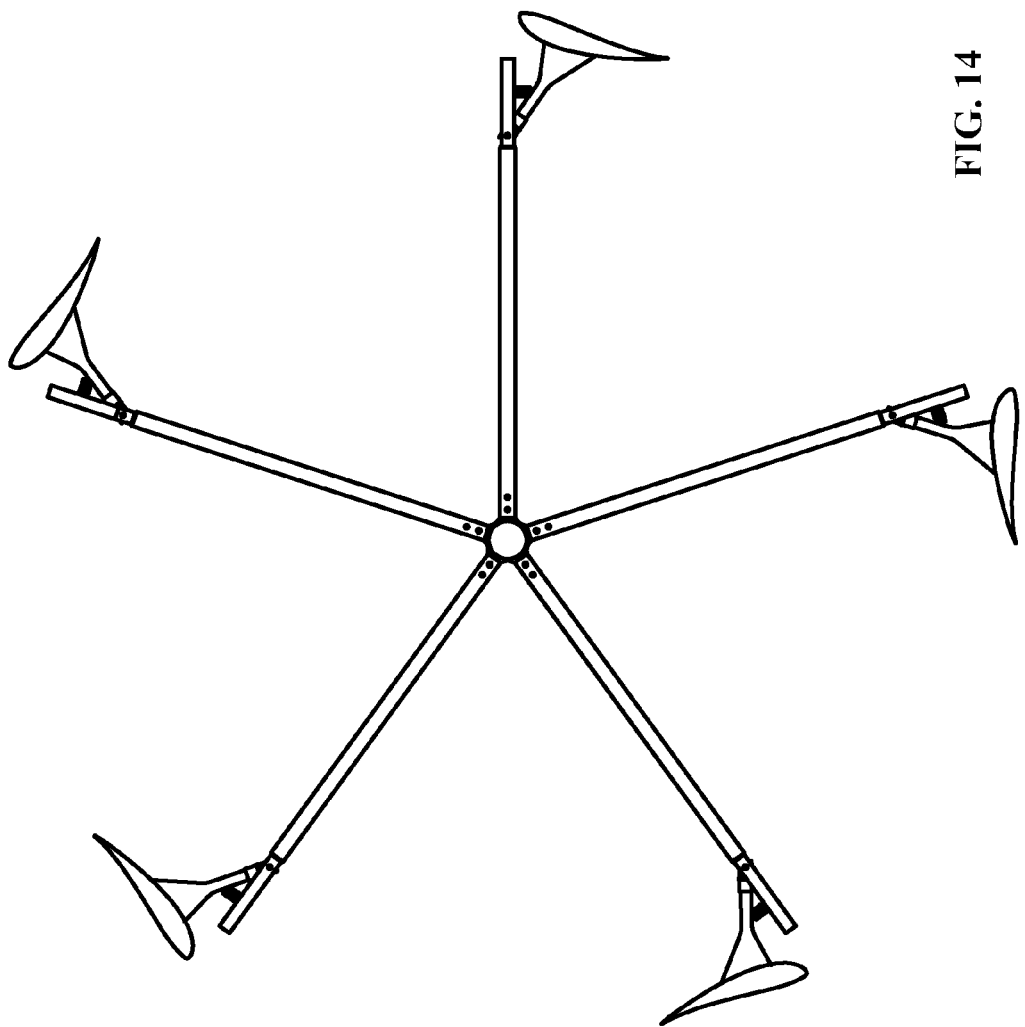
FIG. 14 is a schematic diagram of a wind mill of a lift-type vertical axis wind turbine according to one embodiment of the invention.
Figure 15:
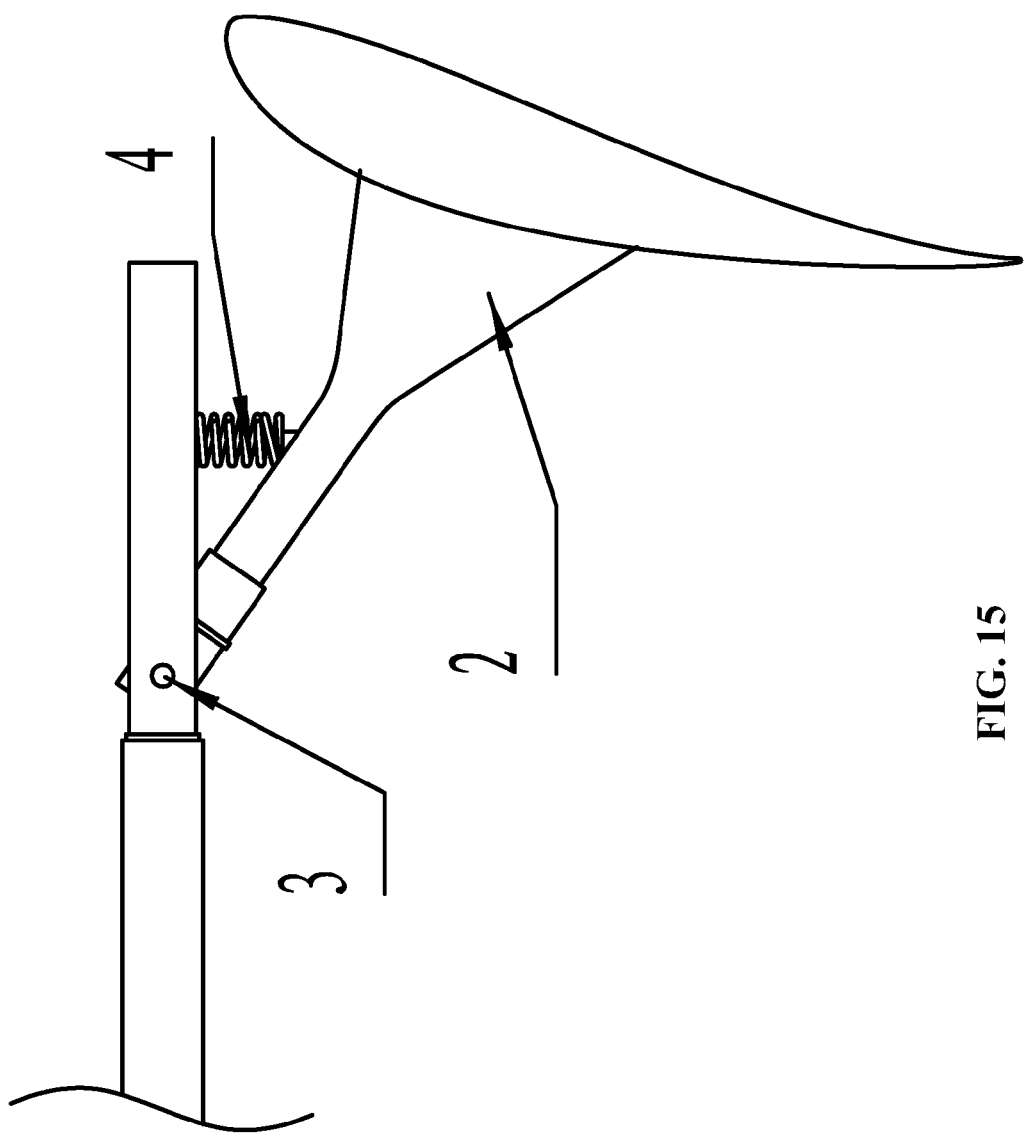
FIG. 15 is a partial enlarged view of FIG. 14.

As shown in FIG. 14 and FIG. 15, the flexible component is a compression spring, one end of which is connected to the rotatable supporting arm, and the other end is connected to the extension arm of the fixed supporting arm. By adjusting the compression spring, various preloads may be set to adjust the rated wind speed. Light and small sized compression springs are desirable, and hydraulic units may replace the compression springs in middle and large-size vertical axis wind turbines.

Example 5

Figure 11:
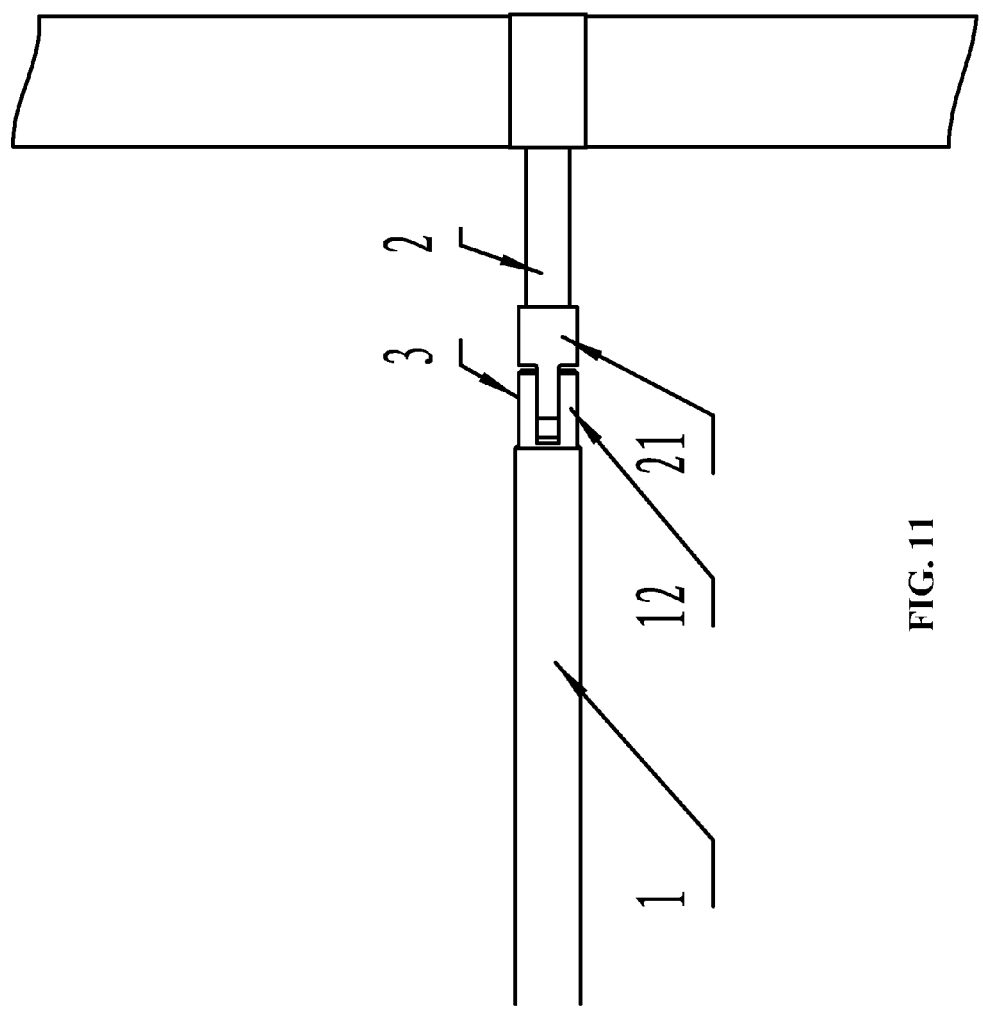
FIG. 11 is a sectional side view of a pivot according to one embodiment of the invention.
Figure 12:
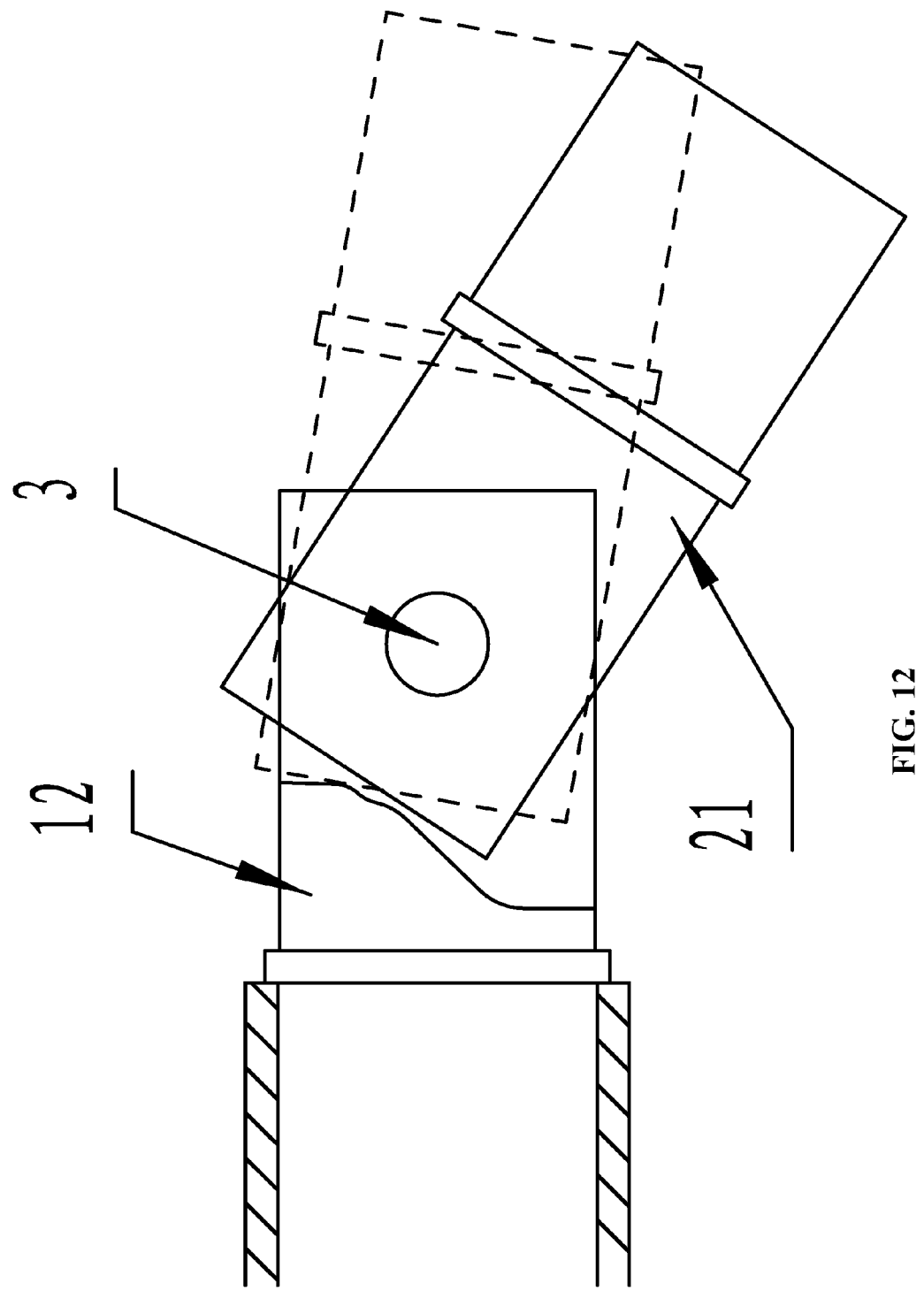
FIG. 12 is a top view of a pivot according to one embodiment of the invention.
Figure 13:
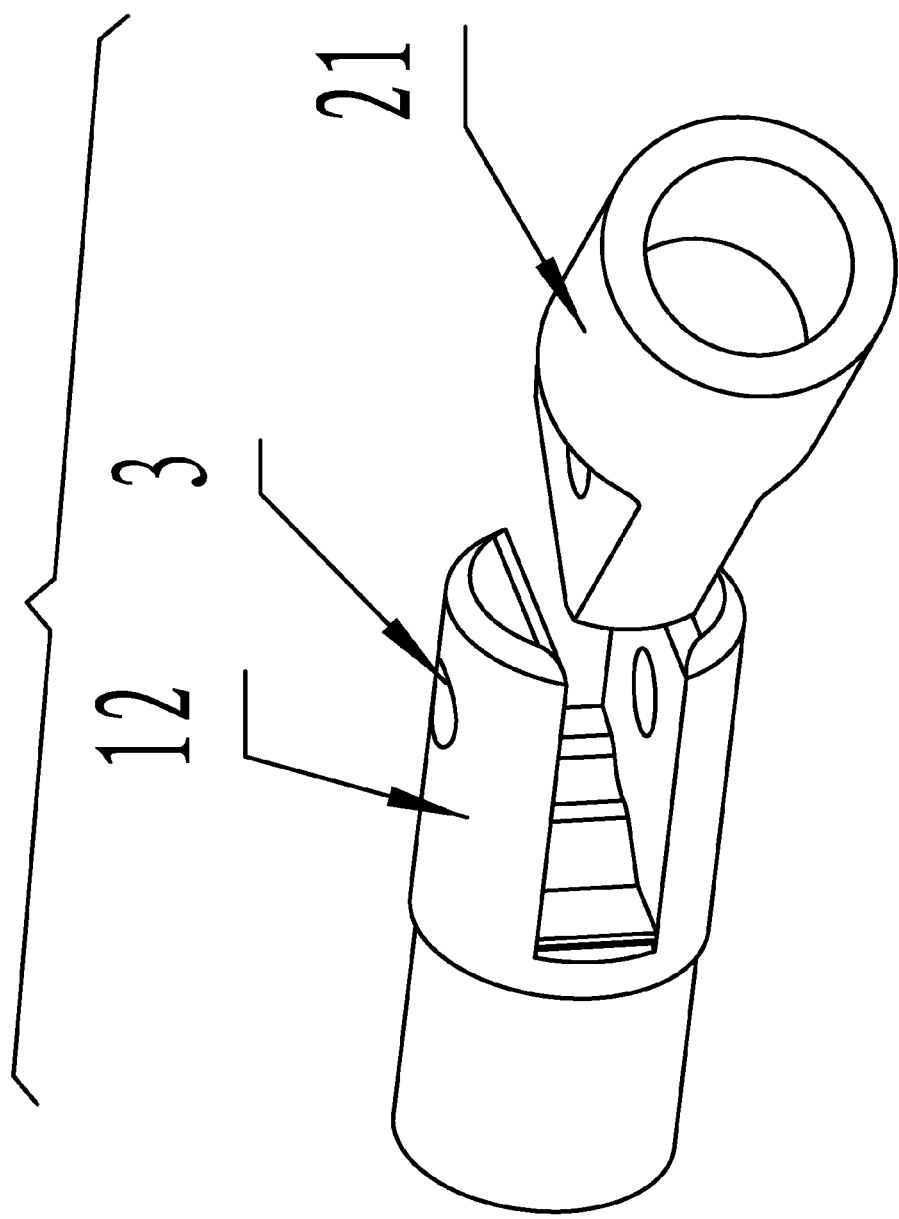
FIG. 13 is a perspective view of a pivot according to one embodiment of the invention.

FIG. 11, FIG. 12, and FIG. 13 are a sectional side view, perspective view, and three-dimensional view of the pivot 3, respectively. The pivot 3 is a slot structure. The end 12 of the fixed supporting arm is connected with the end 21 of the rotatable supporting arm by a bolt. A slot is provided at the end 12 of the fixed supporting arm, and a tongue is provided at the end 21 of the rotatable supporting arm. When the fixed supporting arm and the rotatable supporting arm move around the pivot 3, the contacting interfaces of the slot and the tongue restrict each other, thereby controlling the rotation of the rotatable supporting arm and making the angle as designed. Similarly, the slot and the tongue may interchange, e.g., the tongue is designed at the end 12 of the fixed supporting arm, and the slot is designed at the end 21 of the rotatable supporting arm.

Example 6

In the above examples, the length ratio of the fixed supporting arm to the rotatable supporting arm may be chosen as required. For example, when the length ratio of the fixed supporting arm to the rotatable supporting arm is 10:1, the centrifugal force generated when the rotatable supporting arm rotates around the pivot 3 is small, a small flexible device, for example, a small-sized spring, may be chosen. The length ratio of the fixed supporting arm to the rotatable supporting arm may set at 9:1, 8:1, 7:1; 6:1; 5:1; 4:1, 3:1; or 2:1, etc. When the length ratio of the fixed supporting arm to the rotatable supporting arm set at 1:1, the centrifugal force generated when the rotatable supporting arm rotates around the pivot 3 is big, and flexible devices of large size or output are needed, e.g., a spring with strong tension, size, and weight.

Example 7

Figure 16:
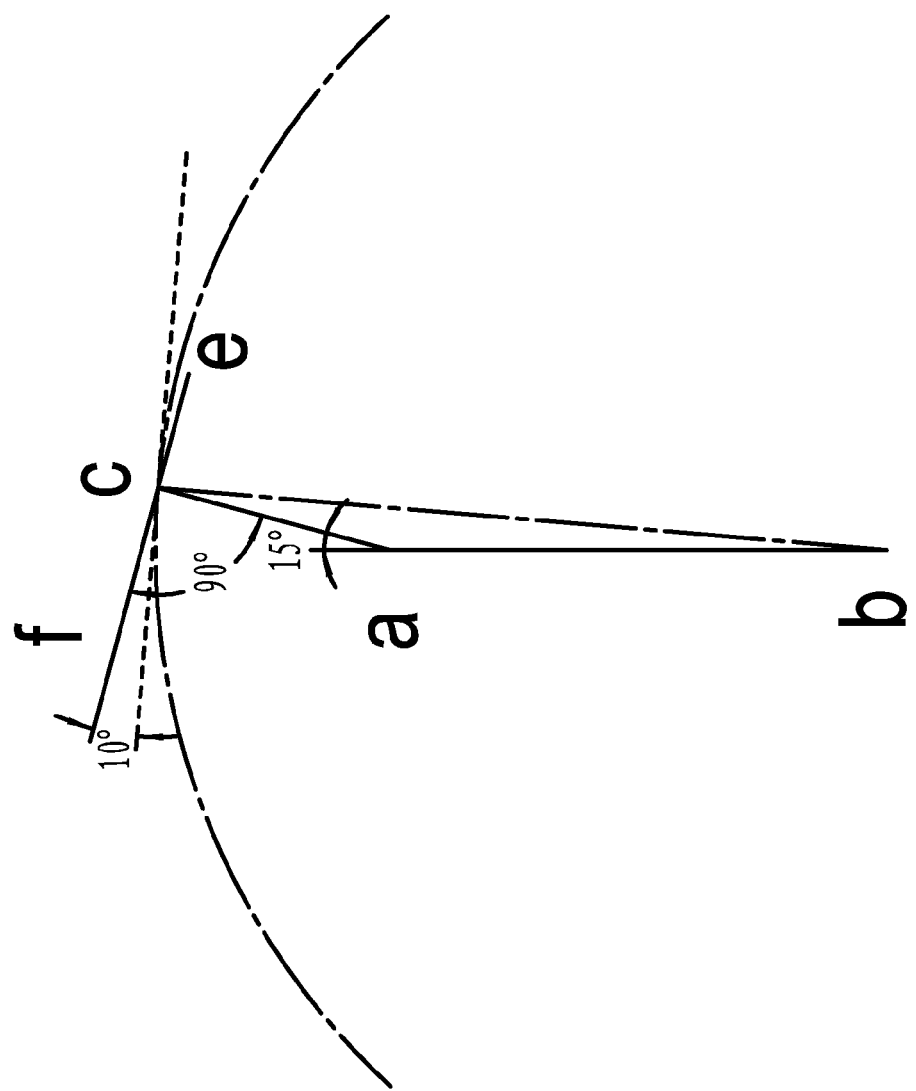
FIG. 16 is a schematic diagram of force analysis for supporting arms according to one embodiment of the invention.

FIG. 16 is a schematic diagram of force analysis for supporting arms. When the blade setting angle α is set at 10° and Angle G at 90°, angle A may be 15°, with the output from the vertical axis wind turbine remaining stable. Therefore, Angle A may range from 0° to 90°.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A wind mill structure of a lift-type vertical axis wind turbine comprising
a vertical shaft,
a plurality of blades, each blade having an airfoil profile and being connected to the vertical shaft,
pairs of supporting arms, each pair having a fixed supporting arm and a rotatable supporting arm for holding each blade to the vertical shaft, each fixed supporting arm at one end connected to the vertical shaft and at the other end to one end of the corresponding rotatable supporting arm, and the other end of the corresponding rotatable supporting arm connected to the blade,
a pivot disposed on a connecting part of the fixed supporting arm and the corresponding rotatable supporting arm,
a plurality of controlling devices, each controlling device corresponding to a pair of the supporting arms and a blade, and each controlling device connecting with one end of the rotatable supporting arm and one end of a neighboring fixed supporting arm and controlling an angle where the rotatable supporting arm rotates around the pivot, and
a plurality of length-adjustable tension devices, each length-adjustable tension device at one end being attached to the corresponding controlling device and at the other end being attached to the neighboring fixed supporting arm,
wherein
the controlling device is a flexible component, a hydraulic unit, an electronic component, or a mixture thereof;
a setting angle α between a chord of the blade and a tangent line that goes through the center of the blade at a position in a circumference during rotation of the blades ranges from −12° to 12°; and
an angle G between the chord of the blades and the corresponding rotatable supporting arms ranges from 7° to 100°.

2. The wind mill structure of the lift-type vertical axis wind turbine of claim 1, wherein an angle A between the rotatable supporting arm and an extension line of the corresponding fixed supporting arm ranges from 0° to 90°.

3. The wind mill structure of the lift-type vertical axis wind turbine of claim 2, wherein the angle A ranges from 20° to 90°.

4. The wind mill structure of the lift-type vertical axis wind turbine of claim 1, wherein a length ratio of the fixed supporting arm to the rotatable supporting arm is between 10:1 and 1:1.

5. The wind mill structure of the lift-type vertical axis wind turbine of claim 1, wherein the controlling device is the flexible component which is an extension spring, a compression spring, or a hydraulic unit.

6. The wind mill structure of the lift-type vertical axis wind turbine of claim 5, wherein the controlling device is the extension spring having one end connected with the corresponding length-adjustable tension device.

7. The wind mill structure of the lift-type vertical axis wind turbine of claim 6, wherein the length-adjustable tension device is a length-adjustable tumbuckle with an adjusting range between 1 and 50 cm.

8. The wind mill structure of the lift-type vertical axis wind turbine of claim 1, wherein
the pivot is of a slot structure with one end of the fixed supporting arm connected with one end of the corresponding rotatable supporting arm through a bolt;
a slot is provided at the one end of the fixed supporting arm, and a tongue is provided at the one end of the corresponding rotatable supporting arm; and
the fixed supporting arm and the corresponding rotatable supporting arm move around the pivot, and contact interfaces of the slot and the tongue restrict each other to control the rotation angle of the rotatable supporting arm with regard to the pivot.

9. The wind mill structure of the lift-type vertical axis wind turbine of claim 3, wherein
the pivot is of a slot structure with one end of the fixed supporting arm connected with one end of the corresponding rotatable supporting arm through a bolt;
a slot is provided at the one end of the fixed supporting arm, and a tongue is provided at the one end of the corresponding rotatable supporting arm; and
the fixed supporting arm and the corresponding rotatable supporting arm move around the pivot, and contact interfaces of the slot and the tongue restrict each other to control the rotation angle of the rotatable supporting arm with regard to the pivot.

10. The wind mill structure of the lift-type vertical axis wind turbine of claim 4, wherein
the pivot is of a slot structure with one end of the fixed supporting arm connected with one end of the corresponding rotatable supporting arm through a bolt;
a slot is provided at the one end of the fixed supporting arm, and a tongue is provided at the one end of the corresponding rotatable supporting arm; and the fixed supporting arm and the corresponding rotatable supporting arm move around the pivot, and contact interfaces of the slot and the tongue restrict each other to control the rotation angle of the rotatable supporting arm with regard to the pivot.

11. The wind mill structure of the lift-type vertical axis wind turbine of claim 7, wherein the pivot is of a slot structure with one end of the fixed supporting arm connected with one end of the corresponding rotatable supporting arm through a bolt;

a slot is provided at the one end of the fixed supporting arm, and a tongue is provided at the one end of the corresponding rotatable supporting arm; and the fixed supporting arm and the corresponding rotatable supporting arm move around the pivot, and contact interfaces of the slot and the tongue restrict each other to control the rotation angle of the rotatable supporting arm with regard to the pivot.

12. The wind mill structure of the lift-type vertical axis wind turbine of claim 1, wherein the airfoil profile of the blades is formed by curves of a conventional airfoil, by a plurality of curves at least meeting a second order derivable function, or by splines.

\* \* \* \* \*